Feb. 12, 1952     B. DENZLER     2,585,747
COLLET CHUCK
Filed April 12, 1949
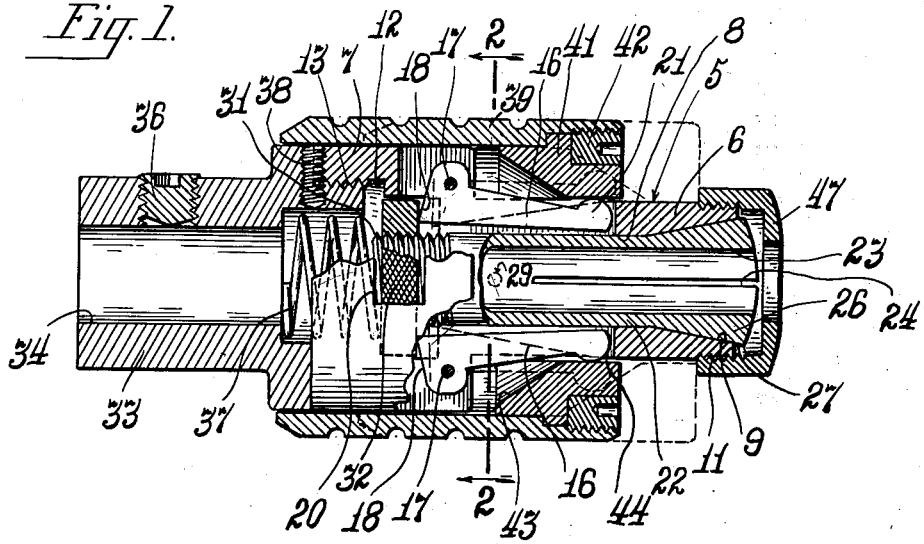
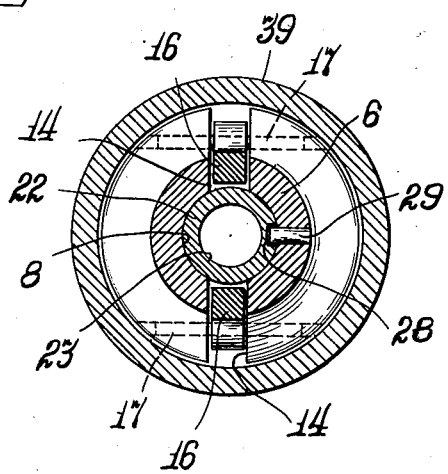
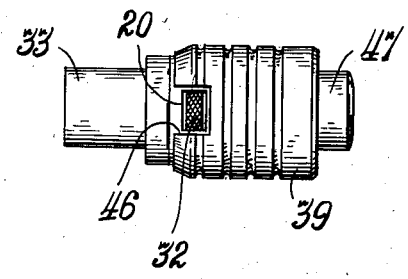
INVENTOR.
BERTHOLD DENZLER
BY
ATTORNEY Patented Feb. 12, 1952

2,585,747

UNITED STATES PATENT OFFICE 2,585,747

COLLET CHUCK

Berthold Denzler, Chicago, Ill., assignor of one-half to Filip Brandhandler, Chicago, Ill.

Application April 12, 1949, Serial No. 87,007

1 Claim. (Cl. 279—51)

This invention relates to an improved collet chuck.

One of the objects of my invention is to provide a collet chuck which is simple in construction, efficient in operation, durable in service, and which can be economically manufactured.

Another object of my invention is to provide a collet chuck in which adjustment of the collet opening may be easily and readily made without disassembly or demounting of the chuck.

Other objects and advantages of my invention will be apparent during the course of the following description.

In the accompanying drawing forming a part of this specification and in which like numerals are employed to designate like parts throughout the same, Fig. 1 is a longitudinal cross-sectional view partially in elevation of a collet chuck embodying my invention;

Fig. 2 is a cross-sectional view taken on line 2—2 of Fig. 1;

Fig. 3 is an elevational view on a reduced scale showing the parts in the dotted line position of Fig. 1.

Referring to the drawing, the numeral 5 designates a chuck body having a reduced forward portion 6 and an enlarged rearward portion 7. The portion 6 is provided with an axial bore 8 terminating in a tapered mouth portion 9 which is threaded exteriorly as at 11. The rearward portion 7 is provided with an enlarged axial bore 12 which is threaded as at 13. The body 5 is provided with diametrically opposed slots 14 which extend through portions 6 and 7 thereof. A pair of levers 16, each received in a slot 14, is mounted on pivots 17 secured in the body portion 7. The said levers have cam surfaces 18 and rounded terminal portions 21. A transverse slot 20 is provided in the portion 7 for a purpose as will be hereinafter described.

Received within the bore 8 and adapted for sliding movement therein is a collet 22 having an axial bore 23. The collet is rendered radially expansible and contractible by providing a plurality of slots 24. The head 26 of the collet is provided with a tapered circumferential surface 27 which cooperates with the tapered mouth portion 9 to effect contraction of the collet jaws. A longitudinal slot 28 on the collet cooperates with a pin 29 extending inwardly of the bore 8 to prevent rotation of the collet 22 relative to the body 5, but permitting relative axial movement therebetween. The rearward end of the collet is threaded as at 31.

The collet 22 is retained in position by a collar 32 in threaded engagement with the threaded end 31 of the collet, the said collar being preferably provided with a knurled circumferential surface. As is seen, the collar 32 is in registering alinement with the slot 20 and one face of the collar is engaged by the cam surfaces 18 of levers 16.

The chuck is adapted for mounting on a driving spindle or shaft by means of member 33 which is in threaded engagement with the chuck body 5, the member 33 being provided with a bore 34 to receive the driving shaft and a set screw 36 to secure the collet on a shaft. A spring 37 abutting the member 33 and the collar 32 is under compression and constantly tends to thrust the collar 32 and, therefore, the collet 22 in an outward direction to relax the grip of the collet on the object being held. Locking means, here a set screw 38, is provided to prevent disengagement of the member 33 from the body 5, the said set screw being received in a threaded opening the axis of which is located on the line of abutment between the body 5 and the member 33 so that one-half of the opening is in the member 33 and the other one-half in the body 5.

The levers 16 are actuated by a sleeve 39 mounted on and slidably axially of the body 5. The sleeve includes an annular member 41, rotatably supported therein, and a collar 42 in threaded engagement with the sleeve end for retaining said member in position. The member 41 is provided with conical and cylindrical surfaces 43 and 44 respectively, which act in the nature of a cam cooperating with the terminal portions 21 of the levers 16 to rock said levers on their pivots when the sleeve is moved axially causing the cam surfaces 18 to act against the collar 32. The rearward end of the sleeve is provided with one or more recesses 46 for a purpose as will be hereinafter explained.

A threaded cap 47 having a central aperture is carried on the end of the body portion 6 and serves as a stop to limit movement of the sleeve 39 and serves also as a cover over the mouth of the collet 22 to prevent the ingress of dirt or other particles which may affect the smooth operation of the chuck.

The operation of my improved collet chuck should be apparent from the foregoing description but briefly stated it is as follows:

Without stopping the rotation of the driving shaft on which the chuck is mounted, the sleeve 39 is moved to the dotted line position shown in Fig. 1. In this position the collet jaws are in expanded or relaxed condition and a tool or other object to be gripped is inserted in the bore 23 of the collet. To effect the gripping of the tool or object, the sleeve 39 is moved to the full line position shown in Fig. 1, causing the terminal portions 21 of the levers 16 to cooperate with the conical surface 43 of the sleeve 39 thereby causing the levers 16 to move inwardly of the slots 14 to retract the collet to grip the tool or object. When the chuck is in operating position the terminal portions 21 of the levers 16 bear against the cylindrical surface 44 of the sleeve which locks the chuck in position when gripping the tool.

While a collet is generally designed to accommodate a particular size of tool shank, frequently variations in the sizes of the shanks require adjustment of the collet opening in order to effect proper gripping of the tool shank. In my improved chuck such adjustment may be made very readily without disassembling or demounting the chuck. To make an adjustment, the sleeve 39 is moved to the position shown in Fig. 3 and then is rotated to aline a slot 46 thereof with the slot 20 of the body 5. A pointed tool, such as a pick or screw driver, may then be inserted in the slot 20 to engage the knurled surface of the collar 32, which collar may then be rotated in either direction to move the collet 22 axially so as to effect a contraction or expansion of the collet jaws.

It will be apparent from the foregoing that in my improved collet chuck the collet is keyed to the chuck body and, while it is movable axially relative thereto, it must rotate with the chuck body. Additionally, the spring 37 which bears against the collar 32 secures the said collar in a position of adjustment and any liability of accidental displacement of the collet from a position of adjustment is thereby prevented.

It will also be apparent that should an adjustment of the collet be required the same may be effected as by inserting a pointed tool into a slot in the body to manipulate the collar, thereby avoiding the necessity for disassembling the chuck or demounting the same from the driving spindle or shaft.

I claim:

In a collet chuck the combination of a chuck body for attachment to a driving spindle, a collet mounted in said body, means to prevent rotation of the collet relative to the body, a collar rotatable in said body threaded onto one end of the collet, cooperating means on the body and on the other end of the collet effective to contract the collet when the latter is moved inwardly with relation to the body, an axially movable sleeve including an internal cam surface mounted on said body, levers fulcrumed in the body, said levers cooperating with the internal cam surface and with the collar to move the sleeve inwardly relative to the body, and the body and sleeve having aligned openings to admit access to the collar for adjusting the collar on the collet.

BERTHOLD DENZLER.

REFERENCES CITED

The following references are of record in the file of this patent:

UNITED STATES PATENTS

| Number | Name | Date |
|---|---|---|
| 1,864,786 | Wilkins | June 28, 1932 |
| 1,918,522 | Crane | July 18, 1933 |
| 2,192,024 | Breitborth et al. | Feb. 27, 1940 |
| 2,335,614 | Spievak | Nov. 30, 1943 |
| 2,436,848 | Benjamin et al. | Mar. 2, 1948 |

FOREIGN PATENTS

| Number | Country | Date |
|---|---|---|
| 206,811 | Germany | Feb. 11, 1909 |